United States Patent
Hamada

(10) Patent No.: US 8,287,149 B2
(45) Date of Patent: Oct. 16, 2012

(54) ILLUMINATING DEVICE AND LIQUID CRYSTAL DISPLAY COMPRISING SAME

(75) Inventor: Tetsuya Hamada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 520 days.

(21) Appl. No.: 12/293,096

(22) PCT Filed: Nov. 2, 2006

(86) PCT No.: PCT/JP2006/321938
§ 371 (c)(1),
(2), (4) Date: Sep. 16, 2008

(87) PCT Pub. No.: WO2007/122761
PCT Pub. Date: Nov. 1, 2007

(65) Prior Publication Data
US 2009/0067158 A1 Mar. 12, 2009

(30) Foreign Application Priority Data

Apr. 19, 2006 (JP) .................................. 2006-115344

(51) Int. Cl.
*F21S 4/00* (2006.01)
*F21V 29/00* (2006.01)
(52) U.S. Cl. .................. 362/249.02; 362/294; 362/97.3; 362/276
(58) Field of Classification Search .................. 362/612, 362/613, 231, 630, 631, 632, 249.02, 97.3, 362/276, 373, 294
See application file for complete search history.

(56) References Cited

U.S. PATENT DOCUMENTS

| | | | | |
|---|---|---|---|---|
| 5,634,711 A | * | 6/1997 | Kennedy et al. | 362/119 |
| 6,611,000 B2 | * | 8/2003 | Tamura et al. | 257/80 |
| 6,999,318 B2 | * | 2/2006 | Newby | 361/719 |
| 7,113,164 B1 | | 9/2006 | Kurihara | |
| 7,312,430 B2 | * | 12/2007 | Wong et al. | 250/205 |
| 7,324,174 B2 | * | 1/2008 | Hafuka et al. | 349/61 |
| 7,339,332 B2 | * | 3/2008 | Cull et al. | 315/291 |
| 7,365,991 B2 | * | 4/2008 | Aldrich et al. | 361/783 |
| 7,423,705 B2 | * | 9/2008 | Len-Li et al. | 349/61 |
| 7,465,082 B2 | * | 12/2008 | Sakamoto et al. | 362/609 |
| 7,474,294 B2 | * | 1/2009 | Leo et al. | 345/102 |
| 7,478,925 B2 | * | 1/2009 | Hiyama et al. | 257/E25.02 |
| 7,501,752 B2 | * | 3/2009 | Ohba et al. | 313/500 |
| 7,513,671 B2 | * | 4/2009 | Ng et al. | 362/612 |
| 7,566,160 B2 | * | 7/2009 | Song et al. | 362/613 |
| 7,588,363 B2 | * | 9/2009 | Hoelen et al. | 362/612 |

(Continued)

FOREIGN PATENT DOCUMENTS

CN 1516088 A 7/2004

(Continued)

OTHER PUBLICATIONS

Official Communication issued in International Patent Application No. PCT/JP2006/321938, mailed on Dec. 26, 2006.

*Primary Examiner* — Peggy A. Neils
(74) *Attorney, Agent, or Firm* — Keating & Bennett, LLP

(57) ABSTRACT

In a direct backlight, a substrate on which LEDs are provided includes a plurality of module substrates. Each module substrate can be reduced in warping or deformation after a blanking process. In addition, each module substrate can be formed thin since bending due to its own weight is small. Consequently, the substrate as a whole and the backlight can be formed thin.

8 Claims, 5 Drawing Sheets

U.S. PATENT DOCUMENTS

| | | | |
|---|---|---|---|
| 7,621,655 B2 * | 11/2009 | Roberts et al. | 362/249.02 |
| 7,633,577 B2 * | 12/2009 | Moon et al. | 349/69 |
| 7,709,774 B2 * | 5/2010 | Schulz et al. | 250/205 |
| 7,777,166 B2 * | 8/2010 | Roberts | 250/205 |
| 7,926,300 B2 * | 4/2011 | Roberts et al. | 62/612 |
| 2005/0265051 A1 | 12/2005 | Yamamoto et al. | |
| 2007/0236156 A1 * | 10/2007 | Lys et al. | 315/291 |

FOREIGN PATENT DOCUMENTS

| | | |
|---|---|---|
| JP | 08-130051 A | 5/1996 |
| JP | 2004-311353 A | 11/2004 |
| JP | 2004-335880 A | 11/2004 |
| JP | 2005-100800 A | 4/2005 |
| JP | 2005-129877 A | 5/2005 |

* cited by examiner

ILLUMINATING DEVICE AND LIQUID CRYSTAL DISPLAY COMPRISING SAME

BACKGROUND OF THE INVENTION

1. Field of the Invention

The present invention relates to an illuminating device used as a backlight in a liquid crystal display and a liquid crystal display incorporating such an illuminating device.

2. Description of the Related Art

In recent years, display devices using a liquid crystal panel, which is thinner than a CRT (cathode ray tube), have been widely used. The liquid crystal panel, not emitting light itself, displays an image by using external light or by being irradiated with light from an illuminating device.

Examples of illuminating devices for use in liquid crystal displays include the direct backlight proposed in JP-A-2004-191490 (pages 4 and 5, FIG. 2). This is used by being placed behind a liquid crystal panel, and has a light source formed of a substrate and LEDs (light emitting diodes) arranged all over the substrate, the liquid crystal panel being irradiated with light emitted from the LEDs.

In recent years, upsizing of liquid crystal display screens has been progressed, and concurrently therewith, larger substrates have come to be employed in direct backlights. Here, a large number of LEDs are mounted on a large substrate, which hinders the mounting of the LED, and the manufacturing yield is low, because the whole substrate needs to be replaced even when a failure occurs in a single LED on the substrate. In addition, the large substrate needs to be thick for the purpose of preventing bending occurring therein due to its own weight, and this prevents realizing thinner liquid crystal displays.

JP-A-2004-191490 proposes a backlight having a substrate on which LEDs are mounted in some sub units such that the brightness of the LEDs of each of the sub units is independently controlled. This, however, cannot help prevent the above problem, because a single substrate is used in the backlight.

Furthermore, the substrate having LEDs mounted thereon is provided at a bottom surface inside a housing, and hence the housing needs to be removed in order to take this substrate out of the liquid crystal display, and this increases the number of steps in the process.

SUMMARY OF THE INVENTION

In order to overcome the problems described above, preferred embodiments of the present invention provide a large direct backlight in which the mounting of LEDs is facilitated, whose manufacturing yield can be improved, in which a thin substrate can be used, and from which a substrate can be taken out without difficulty.

According to a preferred embodiment of the present invention, an illuminating device includes: a substrate; a plurality of LEDs mounted on the substrate; and a control unit arranged to control driving of the LEDs. The substrate is preferably formed of a plurality of module substrates.

According to another preferred embodiment of the present invention, a liquid crystal display includes: a liquid crystal panel; and the illuminating device having the above described structure that is disposed behind the liquid crystal panel.

According to one preferred embodiment of the present invention, the substrate is preferably formed of the plurality of module substrates. Thus, each of the module substrates can be formed small, and thereby a warp occurring therein after blanking processing can be made small; as a result, a warp and deformation occurring in the substrate that is formed of the module substrates can also be made small. In addition, the LEDs can be mounted with improved efficiency. Furthermore, since bending occurring in each of the module substrates is small, they can be formed thin, and this consequently allows the illuminating device to be formed thin. Moreover, a problem occurring in the substrate such as the LEDs not turning on can be dealt with by simply replacing a module substrate containing the malfunctioning portion. This helps improve the manufacturing yield of the illuminating device and reduce the cost of material used for repair.

According to a preferred embodiment of the present invention, a color sensor may be provided on each of the module substrates. By controlling the driving of the LEDs mounted on each of the module substrate according to an output from the color sensor provided on each of the module substrates, light emitted from the illuminating device can be easily kept uniform, and this helps keep the display on the liquid crystal display appropriate. Furthermore, by arranging the plurality of module substrates in a plurality of lines and columns to form the substrate, the brightness and the color of light emitted from each of the module substrates can be controlled more precisely.

According to a preferred embodiment of the present invention, a cut portion may be formed in each of the module substrates for connecting a connector. It allows each of the module substrates to be connected to the control unit, no matter how the module substrates are arranged.

According to a preferred embodiment of the present invention, the LEDs may be fitted into holes formed in the bottom of a housing. By fitting the LEDs into the holes formed in the bottom of the housing, the substrate on which the LEDs are mounted is fitted to the housing from outside thereof, and thus the substrate can be removed from the liquid crystal display without removing the housing and consequently with improved efficiency.

According to a preferred embodiment of the present invention, in a surface of the bottom of the housing that is opposite to a surface thereof that faces the substrate, an inclined surface may be formed around each of the holes such that light emitted from the LED to travel in a nearly horizontal direction can be reflected by this inclined surface. This helps achieve more effective use of light.

According to a preferred embodiment of the present invention, a reflective material may be provided on the face of the bottom of the housing that is opposite to the surface thereof that faces the substrate. This helps increase the brightness of the illuminating device.

According to a preferred embodiment of the present invention, a thermal conductive member may be provided on a surface of the substrate that faces the housing. This allows heat generated by the LEDs to be dissipated more effectively. As a result, temperature change in the LEDs is reduced, and thus the LEDs are allowed to emit light in a stable manner.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
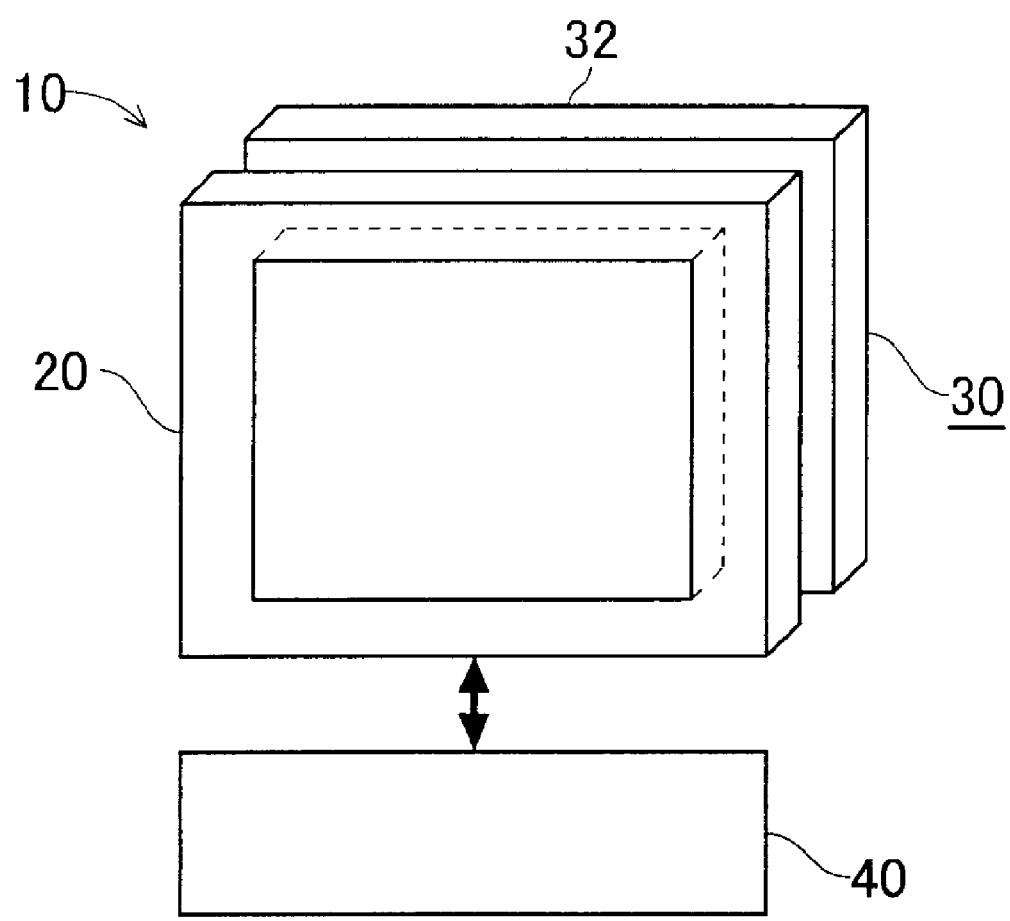
FIG. 1 is a diagram schematically showing the structure of a liquid crystal display device according to a preferred embodiment of the present invention.

A description will be given of preferred embodiments of the present invention with reference to the drawings. FIG. 1 is a diagram schematically showing the structure of a liquid crystal display device according to a preferred embodiment of the present invention, FIG. 2 is an exploded perspective view showing a backlight according to a preferred embodiment of the present invention, and FIG. 3 is a sectional view showing the backlight according to a preferred embodiment of the present invention.

As shown in FIG. 1, a liquid crystal display 10 includes a liquid crystal panel 20, a backlight 30 serving as an illuminating device, and a driver unit 40. The liquid crystal panel 20 includes a TFT substrate, a counter substrate, and liquid crystal held between the TFT substrate and the counter substrate. The liquid crystal panel 20 controls the alignment of the liquid crystal by applying a voltage between the substrates according to a signal from the driver unit 40 so as to display an image. The backlight 30 is disposed behind the liquid crystal panel 20, and irradiates the image displayed on the liquid crystal panel 20 with white light it emits from its light emitting surface. The driver unit 40 controls not only a current to the liquid crystal panel 20 but also a current to the backlight 30.

Figure 2:
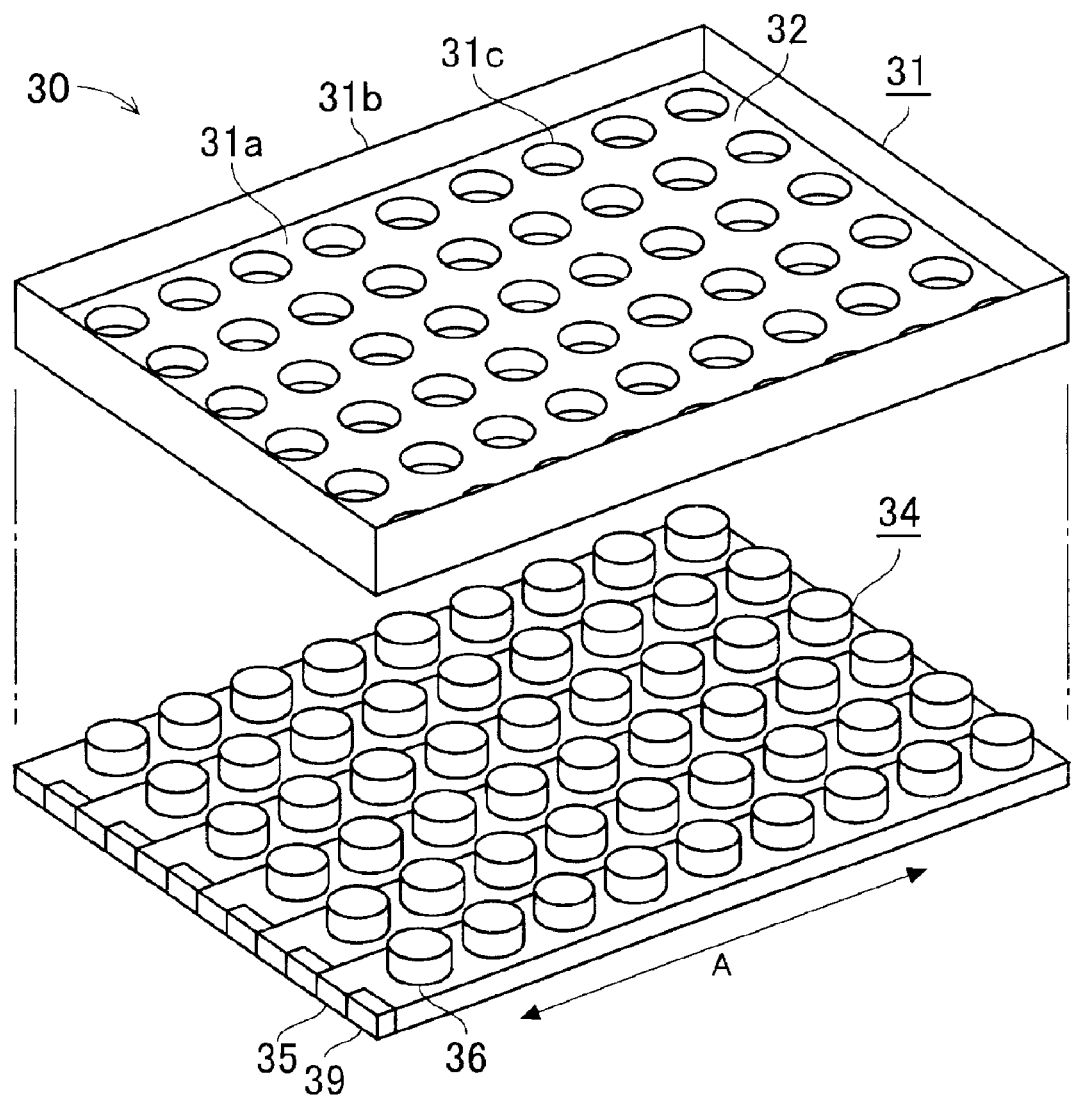
FIG. 2 is an exploded perspective view showing a backlight according to a preferred embodiment of the present invention.
Figure 3:
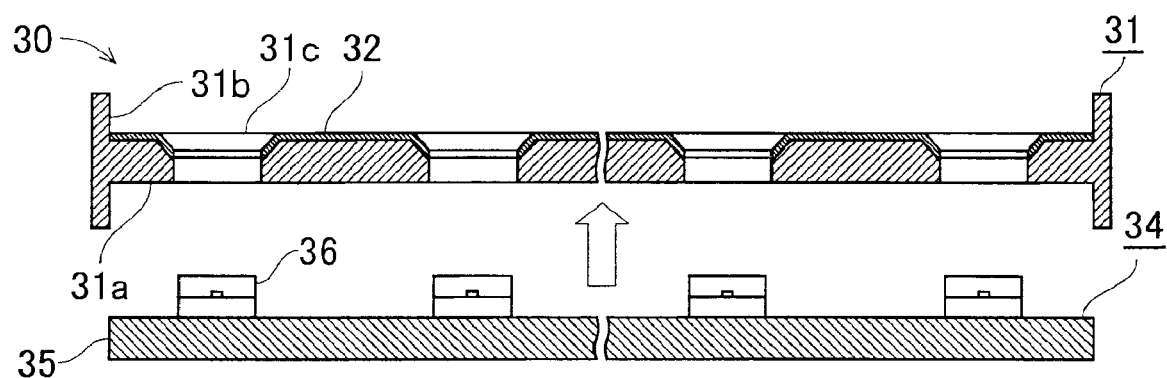
FIG. 3 is a sectional view showing the backlight according to a preferred embodiment of the present invention.
Figure 4:
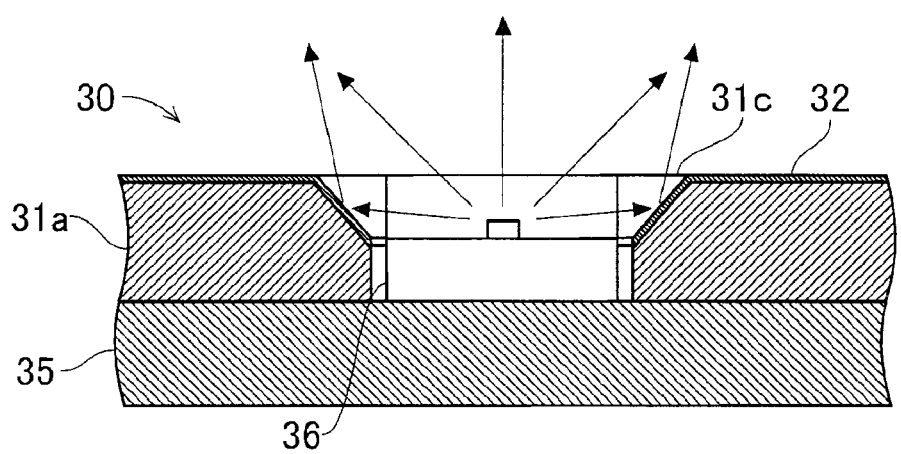
FIG. 4 is a sectional view showing a portion of the backlight according to a preferred embodiment of the present invention.

The backlight 30 is a direct backlight and disposed behind the liquid crystal panel 20, and as shown in FIG. 2, it is provided with a housing 31 and a substrate 34 on which LEDs 36 are mounted. The housing 31 preferably includes a bottom panel 31a in which holes 31c are formed and a side panel 31b formed around the bottom panel 31a. The LEDs 36 are arranged in a plane all over the substrate 34. The substrate 34 is disposed on a surface (hereinafter, outer surface) of the bottom panel 31a of the housing 31 that is opposite to a surface (hereinafter, inner surface) thereof that faces the liquid crystal panel 20 such that the LEDs 36 are exposed on the inner surface of the housing 31 via holes 31c formed in the bottom panel 31a of the housing 31. A reflective member 32 is provided on the inner surface of the housing 31. The reflective member 32 is adapted to reflect light that has been reflected from the liquid crystal panel 20 back toward the liquid crystal panel 20, and the provision thereof helps increase the brightness of the backlight 30.

In this preferred embodiment, the substrate 34 preferably has a modular structure including a plurality of module substrates 35; in FIG. 2, for example, six of the module substrates 35 each of which is elongated in a direction A, a direction along a side of the, substrate 34, are arranged in a direction perpendicular or substantially perpendicular to the direction A. As shown in FIG. 3, the substrate 34 can be fixed by being fitted into the outer surface side of the housing 31. A connector 39 is detachably provided at an end of each of the module substrates 35, and thereby power is independently supplied to each of the module substrates 35. FIG. 2 shows, as an example, the case where the LEDs 36 are mounted to be arranged in a single line in the direction A on each of the module substrates 35, but they may be arranged in a plurality of lines. The number of the module substrates 35 and the number of the LEDs 36 to be mounted are not limited to those shown in the figures but may be changed as necessary, and the same applies hereinafter.

By forming each of the module substrates 35 to be small, a warp occurring therein after blanking processing can be made small. Therefore, by forming the large substrate 34 of a plurality of small module substrates 35, a warp and deformation occurring in the large substrate 34 can also be made small. In addition, LEDs can be mounted with improved efficiency. Furthermore, since bending occurring in each of the module substrates 35 is small even after the LEDs 36 are mounted thereon, they can be formed thin; thus, the substrate as a whole can also be formed thin, and as a result, the backlight 30 and the liquid crystal display 10 can be thinner and lighter in weight. Moreover, in the backlight 30, a problem such as the LEDs 36 not turning on can be dealt with by simply replacing a specific one of the module substrates 35 that contains the portion in which the problem has occurred. This helps improve the manufacturing yield of the backlight 30 and reduce the cost of material used for repair. In addition, less space is needed for the work of mounting the LEDs 36 on the module substrates 35 than in the case where the substrate is a single substrate; thus, whether manually or by using a machine, the LEDs 36 can be mounted on the module substrates 35 with improved efficiency.

In this preferred embodiment, since the substrate 34 is disposed on the outer surface side of the housing 31, it can be easily detached with the housing 31 remaining disposed in the liquid crystal display 10. As a result, the substrate 34 can be detached with an improved efficiency for the purpose of, for example, repairing the substrate 34.

In this preferred embodiment, only the holes 31c are formed in the inner surface of the housing 31, and this facilitates the provision of the reflective material 32. In the case where a substrate is disposed on the inner surface of a housing as has conventionally been practiced, a reflective material needs to be provided on a surface of the substrate, and thus it is necessary to avoid portions thereof where LEDs are to be mounted, which degrades the efficiency with which the reflective material is provided. In this preferred embodiment, in the case where the reflective material 32 is, for example, a white coating material, the reflective material 32 can be provided simply by applying or spraying it on the inner surface of the housing 31; even when the coating material drips in the holes 31c, it does not need to be wiped off as long as the diameter of the holes 31c is set sufficiently greater than that of the LEDs 36. In the case where the reflective material 32 is a sheet, if the sheet has holes formed therein in the same locations as the holes 31c, it can be easily provided.

In the bottom panel 31a of the housing 31, there may be formed tapered shapes as shown in FIG. 3 in such a manner that, in the surface (the inner surface) of the bottom panel 31a that is opposite to the surface thereof that faces the substrate 34, an inclined surface is formed around each of the holes 31a so as to incline toward each of the holes 31a. As shown in FIG.

Figure 5:
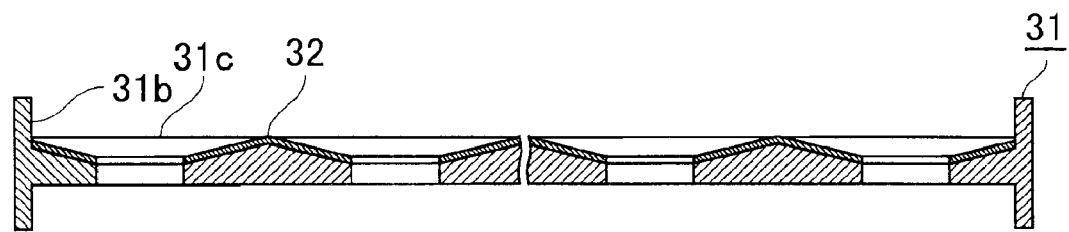
FIG. 5 is a sectional view showing the backlight according to a preferred embodiment of the present invention.

4, which is a sectional view showing a portion of a backlight, this allows light emitted from each of the LEDs 36 in a nearly horizontal direction to be reflected by this inclined surface. This helps achieve more effective use of light, and as a result, the brightness of the backlight 30 can be increased. As shown in FIG. 5, which is a sectional view showing a backlight, the tapered shapes in the bottom panel 31*a* of the housing 31 may be formed in such a manner that no portion of the inner surface is parallel with the outer surface.

Figure 6:
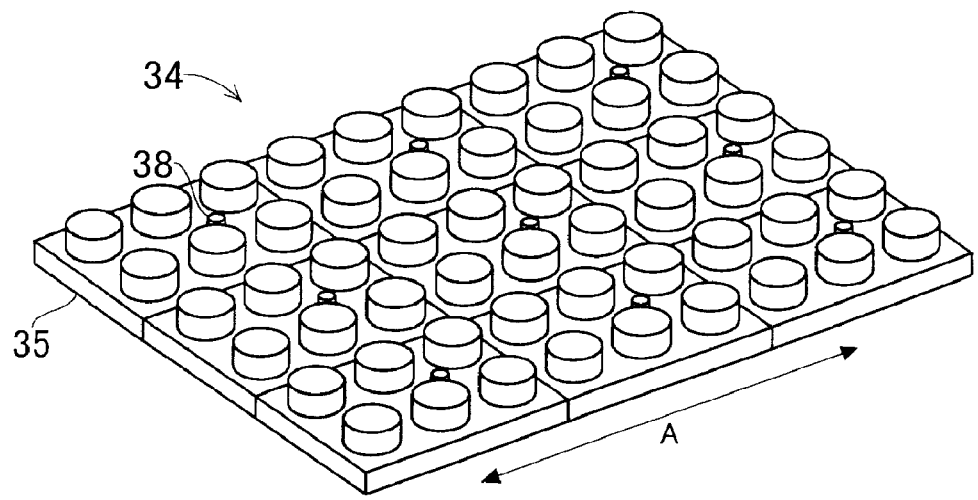
FIG. 6 is a perspective view showing another example of the substrate according to a preferred embodiment of the present invention.

In this preferred embodiment, each of the module substrates 35 may be provided with a color sensor for detecting the brightness and the color of ambient light. The color sensor detects the brightness and the color of light that is emitted from the LEDs 36 around it and that has a mixed color, and an output of the color sensor is fed to the driver unit 40. According to the output, the driver unit 40 controls the amount of current to be supplied to the LEDs 36 on each of the module substrates 35 so as to perform predetermined adjustment of the brightness and the color of light emitted from each of the module substrates 35. In this way, the light emitted from the backlight 30 can be easily kept uniform, and this helps keep the display on the liquid crystal display 10 appropriate. In this case, it is preferable that, as shown in FIG. 6, which is a perspective view showing another example of the substrate according to a preferred embodiment of the present invention, the substrate 34 may include the module substrates 35 arranged in plurality in a direction A and in plurality in a direction perpendicular or substantially perpendicular to the direction A, that is, arranged in a plurality of lines and columns, that the LEDs 36 be mounted on each of the module substrates 35 in a plurality of lines and columns, and that a color sensor 38 be provided on each of the module substrates 35 near the center of the LEDs 36 mounted thereon. This is for the purpose of allowing the color sensor 38 to mainly detect light emitted from the LEDs 36 mounted on the one of the module substrates 35 on which it is provided such that light emitted from each of the module substrates 35 can be controlled more precisely. The LEDs 36 do not necessarily need to be arranged in a square grid pattern, but may be arranged in a rectangular grid pattern, a triangular grid pattern, or the like.

Figure 7:
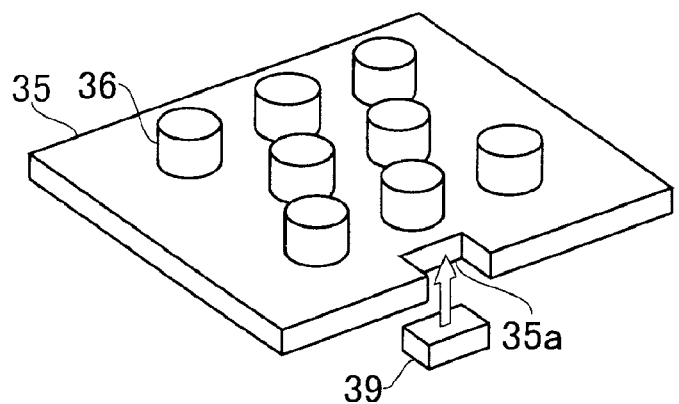
FIG. 7 is a perspective view showing another example of the module substrate according to a preferred embodiment of the present invention.
Figure 8:
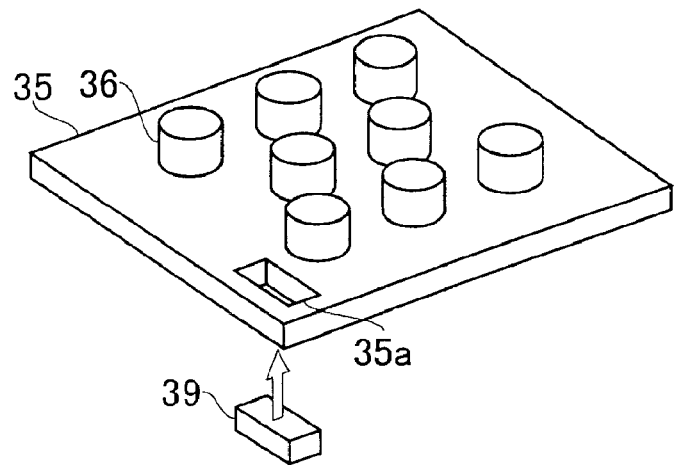
FIG. 8 is a perspective view showing another example of the module substrate according to a preferred embodiment of the present invention.

In the case where the substrate 34 is formed of the module substrates 35 arranged in a plurality of lines and columns, it is preferable that, as shown in FIG. 7, which is a perspective view showing another example of the module substrate according to another preferred embodiment of the present invention, a cut portion 35*a* can be formed in each of the module substrates 35 for connecting a connector 39 thereto. It is typical that a conductor is provided only on the surface of each of the module substrates 35 on which the LEDs 36 are mounted, and even in such a case, the LEDs 36 and the color sensor 38 mounted on each of the module substrates 35 of the substrate 34 can be connected to the driver unit 40 by inserting the connector 39 into the cut portion 35*a* from the rear of the surface of each one of the module substrates 35 on which the LEDs 36 are mounted. The cut portion 35*a* may be formed by cutting the periphery of each of the module substrates 35, or, as shown in FIG. 8, may be formed as a hole in each of the module substrates 35.

Figure 9:
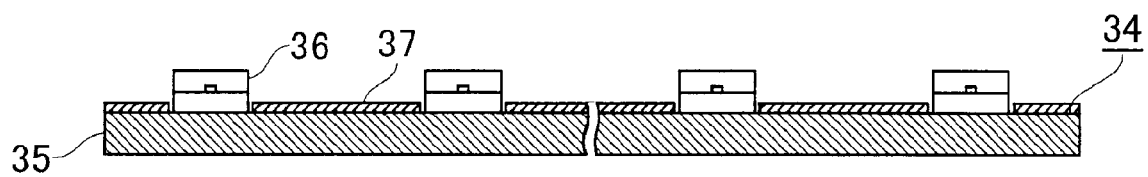
FIG. 9 is a sectional view showing another example of the substrate according to a preferred embodiment of the present invention.

In this preferred embodiment, as shown in FIG. 9, which is a sectional view showing another example of the substrate according to a preferred embodiment of the present invention, a sheet-shaped thermal conductive member 37 formed of silicone rubber or the like may be provided on a portion of the module substrates 35 that faces the outer surface of the housing 31. This makes it possible to attach the module substrates 35 closely to the outer surface of the housing 31 even when a bump is formed due to a conductor pattern provided on the surface of each of the module substrates 35; as a result, heat generated by the LEDs 36 can be dissipated via the housing 31 more effectively. By reducing temperature change in the LEDs 36 by use of the thermal conductive member 37, the light emission of the LEDs 36, whose light emission property is liable to change with temperature change, can be stabilized.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illuminating device, comprising:
a substrate;
a plurality of LEDs mounted on the substrate; and
a control unit arranged to control driving of the LEDs; wherein
the substrate includes a plurality of module substrates;
the module substrates are provided with cut portions arranged to connect connectors to the module substrates, the connectors connecting the LEDs to the control unit; and
the cut portions are through holes.

2. The illuminating device of claim 1, wherein the plurality of module substrates are arranged in a plurality of lines and columns.

3. An illuminating device, comprising:
a substrate;
a plurality of LEDs mounted on the substrate;
a control unit arranged to control driving of the LEDs; and
a housing arranged to fix the substrate; wherein
the substrate includes a plurality of module substrates;
the LEDs mounted on the substrate are fitted into holes formed in a bottom of the housing;
an inclined surface that is disposed around each of the holes is provided in a surface of a bottom of the housing that is opposite to a surface of the bottom of the housing that faces the substrate; and
a thermal conductive member made of rubber is provided on a surface of the substrate that is opposite to a surface of the substrate that faces the bottom of the housing.

4. The illuminating device of claim 3, wherein a reflective material is provided on the surface of the bottom of the housing that is opposite to the surface thereof that faces the substrate.

5. A liquid crystal display, comprising:
a liquid crystal panel; and
the illuminating device of claim 1 that is disposed behind the liquid crystal panel.

6. The illuminating device of claim 3, wherein the plurality of module substrates are arranged in a plurality of lines and columns.

7. The illuminating device of claim 3, wherein a cut portion is formed in each of the module substrates for connecting a connector thereto, the connector connecting the LEDs to the control unit.

8. A liquid crystal display, comprising:
a liquid crystal panel; and
the illuminating device of claim 3 that is disposed behind the liquid crystal panel.

* * * * *